UNITED STATES PATENT OFFICE

2,597,446

TERTIARY BUTYL SECONDARY AMINES AND METHOD FOR PREPARING THE SAME

William F. Bruce, Havertown, Pa., assignor to Wyeth Incorporated, Philadelphia, Pa., a corporation of Delaware No Drawing. Application November 29, 1949, Serial No. 130,084

9 Claims. (Cl. 260—338)

This invention relates to the preparation of organic compounds and more particularly relates to the preparation of new and highly useful alcohols and sympathomimetic amines by a novel sequence of steps.

The compounds of the invention are prepared by reacting aromatic aldehydes with a Grignard reagent, specifically an alkyl magnesium halide, to form a complex which is then hydrolyzed to yield useful aromatic secondary alcohols. The particular Grignard used is preferably isopropyl magnesium chloride or bromide.

The secondary alcohol obtained is now dissolved in an organic acid solvent together with an inorganic cyanide, and the total mixture is cooled. To the cooled mixture is now added a strong acid, preferably a mineral acid, dissolved in another portion of organic acid solvent. A change in color indicates that reaction is taking place. After reaction has ceased, the mixture is diluted with water, the acidity is neutralized and the reaction product, a formylamine, is isolated.

Instead of directly forming the formylamine from the secondary alcohol, one may, if desired, prepare the corresponding olefin from the alcohol and then react the olefinic compound with the cyanide and acid to form the formylamine. A satisfactory method of dehydration involves the use of sulfonic acids, such as benzene or toluene or naphthalene sulfonic acid, sulfamic acid or either phosphoric or sulfuric acid, on vermiculite or other carrier. It should be pointed out, however, that there is no advantage in preparing the intermediate olefin since the desired formylamine may easily be produced from the alcohol itself.

The preparation of the desired and highly useful secondary amines, and specifically secondary N-methyl amines, is carried out by the reduction of the formylamine compound as indicated above. Thus, the formylamine is solubilized in a solvent such as an ether and is then reacted with a metallic hydride such as sodium, potassium, lithium, calcium or aluminum hydride. More preferable however, is the use of either sodium borohydride or lithium aluminum hydride, the latter being especially preferred. After the reaction, the excess reagent is decomposed with water and acidified. Layers form, the aqueous layer being retained, neutralized and distilled to obtain the N-methyl secondary amine.

The reaction involving the secondary alcohol for the formation of the intermediate formamido compound may utilize either gaseous hydrogen cyanide or any metal cyanide which will form hydrogen cyanide in the presence of acid. The alkali metal cyanides are preferred for this step. The organic acid solvent may be any lower alkyl mono-carboxylic acid of not more than five carbon atoms. With regard to the mineral acids used, while concentrated sulfuric acid is preferred, other strong acids such as phosphoric, chlorosulfonic, the sulfonic acids in general, sulfamic acid, etc., may be used.

The process sequence, as described hereinabove, is highly useful in the preparation of a valuable series of aromatic, N-methyl secondary amines having useful pharmacological properties. By starting with specific benzaldehydes, one may prepare valuable N-methyl-omega-phenyl-tertiary butylamines otherwise difficult to prepare by known procedures. Thus, by the procedure of the invention, one may prepare N-methyl-omega-alkoxyphenyl tertiary butyl amine or N-methyl - omega-(3,4-dioxymethylenephenyl) - tertiary butylamine, both being easily hydrolyzable to the mono- or dihydroxyphenyl-tertiary butyl-N-methyl amines. The alkoxy and hydroxy substituted phenyl compounds have been found to be easily solubilized, pharmacologically active substances useful for their sympathomimetic action.

Other benzaldehydes besides anisaldehyde or piperonal may be used depending on the particular end product desired, as long as the substituent does not interfere with the reactants, and particularly the Grignard reagent. Thus one may obtain valuable secondary alcohols and amines by reacting isopropyl magnesium halide with benzaldehydes of the general formula:

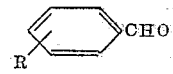

where R stands for one or more lower alkyl radicals, preferably methyl or ethyl, or useful functional groups such as halides, preferably chlorine or bromine radicals, nitro or sulfonic acid radicals. As already indicated, the ethers are especially valuable substituents. Since hydroxyl radicals, and probably also amino groups on the ring would interfere with the desired reaction, aldehydes having these reactive substituents can not be used.

The following examples illustrate in greater detail the various steps of the process. These examples are of course merely illustrative and not limitative of the invention since other starting compounds and reagents as is suggested above may be used without departing from the inventive concept.

EXAMPLE 1

*Preparation of N-methyl-(p-methoxyphenyl)-tert. butylamine*

To 26.7 grams of magnesium covered with 800 cc. of dry ethyl ether was added a solution of 85 grams of isopropyl chloride in 300 cc. of ethyl ether over a period of 3 hours.

To the above reaction mixture was added slowly 143 grams of anisaldehyde (1.1 mols) in 200 cc. of ether. A vigorous reaction occurred. When the addition was complete, the reaction mixture was poured into 2 liters of ice water, neutralized with sulfuric acid and the ether layer was separated, dried with magnesium sulfate and filtered. The filtrate was concentrated and distilled. The secondary alcohol, identified as alpha-isopropyl anisyl alcohol or 1,1-dimethyl-2-hydroxy-2-(p-methoxyphenyl)ethane boiled at 104–106° C. at 1 mm. pressure. $N_D^{20}$ 1.5323;

$$d_{20}^{20} 1.0501$$

Analysis $C_{11}H_{16}O_2$, calc. C—73.7%, found, 75.6%; calc. H—8.95%, found, 8.23%; $M_R$ calcd. 52.57; obs. 53.2.

Thirty grams of the alcohol as produced above was mixed with 2 cc. of concentrated sulfuric acid on 5 grams of vermiculite and heated to 90° C. at 100 mm. pressure for 5 minutes. The reaction mixture was allowed to cool to 50° C. and was poured into 150 cc. of ice water. The mixture was then neutralized with sodium hydroxide and extracted with ether. The ether extract was dried with magnesium sulfate and filtered. The filtrate was concenrated and distilled to give the olefin product, $$p\text{-}CH_3O \cdot C_6H_4 \cdot CH=C(CH_3)_2$$

which boils at 90° C. at 2 mm.; $N_D^{20}$ 1.5515;

$$d_{20}^{20} 1.0081$$

$M_R$ calc. 50.58; found 51.38.

A mixture of 3.95 grams of sodium cyanide in 10 cc. of glacial acetic acid was added to a solution of 11 cc. of concentrated sulfuric acid and 10 cc. of acetic acid with cooling. Thirteen grams of the olefin, prepared as indicated above was added rapidly to this mixture. The temperature rose from 25° to 80° C. in less than 2 minutes. After cooling to room temperature, the dark red solution was poured into a solution of 60 grams of sodium hydroxide in 125 cc. of water. The formylamine product, appearing as an oil layer in the aqueous mixture was distilled overhead under vacuum, the product boiling at about 200° C. at 1 mm. pressure.

The distillate (3.5 grams) was dissolved in 25 cc. of ethyl ether and a suspension of 2.3 g. of lithium aluminum hydride (an excess) in about 50 cc. of ether, was added. This mixture was stirred and warmed on a water-bath under a reflux condenser for about one-half hour. The mixture was now cooled to room temperature and water was added dropwise until no further reaction took place. The aqueous mixture was now acidified with sulfuric acid (10% solution) until the mixture was strongly acid. Two layers are formed and separated, the ether layer being washed with acid and discarded. The aqueous layer, to which the wash liquid was added, was made strongly alkaline with sodium hydroxide and was then steam-distilled. The desired product was removed overhead. The distillate was extracted with ether and the ether solution was dried with sodium hydroxide and concentrated by heating. The desired product, namely, N-methyl-omega-(p-methoxyphenyl)-tert. butylamine was obtained, having a boiling point of approx. 100–110° C. at 24 mm. pressure.

EXAMPLE 2

*Preparation of N-methyl-(p-hydroxyphenyl)-tert. butylamine*

The secondary methoxyphenyl amine on isolation was converted by hydrolysis to the hydroxyphenyl compound by dissolving the amine in 48% hydrobromic acid and refluxing for 4 hours, using a ratio of about 1 gram of amine to about 10 cc. of acid. The solution was cooled, neutralized with alkali to a pH 7–8 and extracted with a 50–50 mixture of ethyl acetate and diethyl ether. The solvent extract was acidified with methanolic hydrochloric acid, and most of the solvent was removed by distillation. A small amount of petroleum ether was added to the residue and crystals of N-methyl-(p-hydroxyphenyl)-tert. butylamine hydrochloride appeared. These were filtered and dried. The melting point of the product was 224–7° C.; Cl, calcd. 17.75; found 18.3.

EXAMPLE 3

*Preparation of N-methyl-omega-(3,4-dioxymethylenephenyl)-tert. butylamine*

The secondary alcohol, namely alpha-isopropyl-piperonyl alcohol or 1,1-dimethyl-2-hydroxy-2-(3,4-dioxymethylenephenyl) ethane was prepared in substantially the same manner as disclosed above for the anisyl compound, using 1 mol of piperonal in 250 cc. of ether which was added to the Grignard reagent. The alcohol obtained, namely $CH_2O_2 \cdot C_6H_3 \cdot CH(OH)CH(CH_3)_2$ had a boiling point of 121–123° C. at 6 mm. $N_D^{24.5}$ 1.5757;

$$d_{25}^{25} 1.1782$$

$M_R$ calc. 54.19, found 54.05.

A solution of 10 grams of sodium cyanide, 16.4 grams of the piperonyl alcohol and 30 cc. of glacial acetic acid was cooled with ice. To this solution was added 15 cc. of concentrated sulfuric acid dissolved in 30 cc. of glacial acetic acid; with continuous cooling and stirring. Reaction was indicated by the change in color. The mixture was allowed to rise to room temperature and was permitted to stand for 2 hours. After this time, it was poured onto 200 grams of ice and 100 cc. of water. The mixture was then made basic with sodium hydroxide and was extracted 4 times with 50 cc. portions of benzene. The benzene solution was dried with anhydrous sodium sulfate, filtered and concentrated to remove the benzene.

The concentrated fraction, after removal of benzene, was now reduced by dissolving one gram of the fraction in 75 cc. of di-n-butyl ether (anhydrous). To this is added 50 ml. of 1% lithium aluminum hydride suspension in the same solvent. A reaction takes place, the temperature rises and the mixture is heated at about 100° C. for about 12 hours. The mixture is cooled to room temperature and water is added dropwise until no further reaction takes place. The reaction product is worked up as described above for the methoxyphenyl secondary amine and N-methyl - omega - (3,4 - dioxymethylenephenyl) - tert. butylamine is isolated as a product of the process.

EXAMPLE 4

*Preparation of N-methyl-(m,p-dihydroxyphenyl)-tert. butylamine*

The piperonyl secondary amine is hydrolyzed to the dihydroxyphenyl compound by the use of 48% hydrobromic acid, the procedure being essentially the same as described in Example 2. However, it is necessary that the hydrolysis reaction be carried out here under non-oxidizing conditions. While nitrogen substantially free of oxygen was used, one may use hydrogen, or other inert or reducing gas in lieu thereof.

The amine compounds prepared as described above are useful either in the free state or as salts of organic or inorganic acids such as hydrochloric, sulfuric, phosphoric, lactic, tartaric, oleic or palmitic acids. These salts are easily prepared in known manner and the procedure for obtaining them, therefore, need not be described.

I claim:

1. The process of forming secondary amines comprising reacting isopropyl magnesium halide with a benzaldehyde of the formula

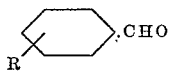

wherein R stands for a member of the group consisting of a methylenedioxy radical and from 1 to 2 lower alkoxy, halogen, nitro and sulfonic acid radicals, hydrolyzing the complex formed to obtain a secondary alcohol, solubilizing said secondary alcohol in a lower alkyl mono-carboxylic acid, cooling said mixture, reacting said secondary alcohol with hydrogen cyanide to form a formamide and then reducing said formamide with an alkaline metal hydride reducing agent to obtain the desired secondary amine.

2. The process of forming secondary amines comprising reacting a lower alkoxy benzaldehyde with isopropyl magnesium halide, hydrolyzing the complex formed to obtain 1,1-dimethyl-2-hydroxy-2-(lower-alkoxyphenyl)-ethane, reacting said alcohol with an inorganic cyanide under strong acid conditions to obtain a formylamine and finally reducing said formylamine with a metallic hydride to form N-methyl-omega-(lower-alkoxyphenyl)-tert. butylamine.

3. The process of forming secondary amines comprising reacting piperonal with isopropyl magnesium halide, hydrolyzing the complex formed to obtain 1,1-dimethyl-2-hydroxy-2-(3,4-dioxymethylenephenyl)-ethane, reacting said hydroxy compound with an inorganic cyanide under strong acid conditions to obtain omega-(3,4-methylenedioxyphenyl)-tert. butyl formylamine, and then reducing said formylamine with a metallic hydride to form N-methyl-omega-(3,4-dioxymethylenephenyl)-tert. butylamine.

4. The process of forming secondary amines comprising reacting a lower-alkoxy benzaldehyde with isopropyl magnesium halide, hydrolyzing the complex formed to obtain the alcohol 1,1-dimethyl-2-hydroxy-2-lower alkoxyphenyl-ethane, solubilizing said alcohol in a lower alkyl mono-carboxylic acid, cooling said mixture, reacting said alcohol with hydrogen cyanide to form a formylamine and then reducing said formylamine with an alkaline metal hydride reducing agent to form a lower alkoxy substituted N-methyl-1,1-dimethyl-2-phenylethyl amine.

5. New compounds selected from the group consisting of secondary amines having the formula

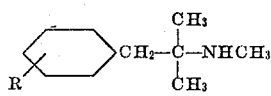

where R stands for a member of the group consisting of a methylenedioxy radical and from 1 to 2 lower alkoxy, hydroxy, halogen, nitro and sulfonic acid radicals; and the acid addition salts thereof.

6. As new compounds, N-methyl-omega-(lower-alkoxyphenyl)-tert. butylamine.

7. The new compound, N-methyl-omega-(3,4-methylenedioxyphenyl)-tert. butylamine.

8. N-methyl-omega-(p-hydroxyphenyl)-tert. butylamine.

9. N-methyl-omega-(m,p-dihydroxyphenyl)-tert. butylamine.

WILLIAM F. BRUCE.

REFERENCES CITED

The following references are of record in the file of this patent:

UNITED STATES PATENTS

| Number | Name | Date |
|---|---|---|
| 2,309,150 | Woodruff | Jan. 26, 1943 |
| 2,309,151 | Woodruff | Jan. 26, 1943 |
| 2,344,356 | Hildebrandt | Mar. 14, 1944 |
| 2,378,889 | Alles et al. | June 26, 1945 |
| 2,457,660 | Gresham et al. | Dec. 28, 1948 |

FOREIGN PATENTS

| Number | Country | Date |
|---|---|---|
| 274,350 | Germany | May 16, 1914 |
| 109,040 | Sweden | Nov. 16, 1943 |

OTHER REFERENCES

French Bull. Soc. Chim., pages 766–769, 1947.
Nystrom et al., J. A. C. S., vol. 70, pages 3738–3740.